US011609334B1

(12) United States Patent
Armenyan et al.

(10) Patent No.: US 11,609,334 B1
(45) Date of Patent: Mar. 21, 2023

(54) TECHNIQUES FOR POINT CLOUD PROCESSING UTILIZING POINT INDICES

(71) Applicant: AEVA, INC., Mountain View, CA (US)

(72) Inventors: Khachatur Armenyan, Santa Clara, CA (US); Youye Xie, Mountain View, CA (US); Jose Krause Perin, Mountain View, CA (US); Amol Gole, Sunnyvale, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/896,159

(22) Filed: Aug. 26, 2022

(51) Int. Cl.
*G01C 3/08* (2006.01)
*G01S 17/89* (2020.01)
*G01S 7/493* (2006.01)
*G01S 17/931* (2020.01)
*G01S 17/32* (2020.01)

(52) U.S. Cl.
CPC .............. *G01S 17/89* (2013.01); *G01S 7/493* (2013.01); *G01S 17/32* (2013.01); *G01S 17/931* (2020.01)

(58) Field of Classification Search
None
See application file for complete search history.

(56) References Cited

U.S. PATENT DOCUMENTS

| 11,262,437 | B1 * | 3/2022 | Krause Perin | G01S 7/4911 |
| 2017/0249401 | A1 * | 8/2017 | Eckart | G06K 9/6282 |
| 2020/0126208 | A1 * | 4/2020 | Ponto | G06T 19/20 |
| 2022/0108494 | A1 * | 4/2022 | Li | G06T 17/00 |

FOREIGN PATENT DOCUMENTS

CN 114693505 A * 7/2022 ............... G06T 1/60

* cited by examiner

*Primary Examiner* — Mark Hellner
(74) *Attorney, Agent, or Firm* — Womble Bond Dickinson (US) LLP

(57) ABSTRACT

A light detection and ranging (LIDAR) system includes an optical receiver to generate a plurality of data points associated with one or more return beams from a target of the LIDAR system, a processor, and a memory. The memory stores the plurality of data points and stores instructions that cause the LIDAR system to: perform a processing operation on a first data point of the plurality of data points to determine a second data point of the plurality of data points with which to modify the first data point; generate, as output of the processing operation, a first index to a first memory location of the first data point and a second index to a second memory location of the second data point; and generate a point cloud corresponding to the target based on the first data point as modified by the second data point.

20 Claims, 9 Drawing Sheets

900

GENERATE A FIRST INDEX TO A FIRST MEMORY LOCATION OF A FIRST STORED VALUE ASSOCIATED WITH A FIRST DATA POINT, FROM THE PLURALITY OF DATA POINTS, AND A SECOND INDEX TO A SECOND MEMORY LOCATION OF SECOND STORED VALUE ASSOCIATED WITH A SECOND DATA POINT, FROM THE PLURALITY OF DATA POINTS
910

USING THE FIRST AND SECOND INDICES AS INPUT, PERFORM A FIRST PROCESSING OPERATION TO DETERMINE WHETHER TO MODIFY THE FIRST DATA POINT, USING THE SECOND DATA POINT, TO PRODUCE A NEW DATA POINT
920

PROVIDED THE FIRST PROCESSING OPERATION DETERMINES THAT A FIRST COMPARISON BETWEEN THE FIRST STORED VALUE AND THE SECOND STORED VALUE SATISFIES A FIRST SET OF CRITERIA: COMMUNICATE THE FIRST AND SECOND INDICES AS INPUT TO A SECOND PROCESSING OPERATION TO DETERMINE WHETHER TO MODIFY THE FIRST DATA POINT, USING A THIRD DATA POINT, TO PRODUCE THE NEW DATA POINT, WHEREIN THE FIRST INDEX IDENTIFIES THE FIRST STORED VALUE AND THE SECOND INDEX IS ADJUSTED BY THE SECOND PROCESSING OPERATION TO IDENTIFY A THIRD STORED VALUE, RELATED TO THE THIRD DATA POINT, STORED AT A THIRD MEMORY LOCATION
930

PROVIDED THE SECOND PROCESSING OPERATION DETERMINES THAT A SECOND COMPARISON BETWEEN THE FIRST STORED VALUE AND THE THIRD STORED VALUE SATISFIES A SECOND SET OF CRITERIA THAT IS DIFFERENT FROM THE FIRST SET OF CRITERIA:
RETRIEVE, USING THE FIRST INDEX, THE FIRST STORED VALUE TO PRODUCE A FIRST PORTION OF THE NEW DATA POINT FOR STORAGE WITHIN A POINT CLOUD; AND
RETRIEVE, USING THE SECOND INDEX, THE THIRD STORED VALUE TO PRODUCE A SECOND PORTION OF THE NEW DATA POINT FOR STORAGE WITHIN THE POINT CLOUD
940

FIG. 9

TECHNIQUES FOR POINT CLOUD PROCESSING UTILIZING POINT INDICES

FIELD OF INVENTION

The present disclosure is related to light detection and ranging (LIDAR) systems in general, and more particularly to data point processing in LIDAR systems.

BACKGROUND

LIDAR systems, such as frequency-modulated continuous-wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal (e.g., a returned optical signal), delayed by the round-trip time to the target and back, generates signals at the receiver with frequencies that are proportional to the distance to each target in the field of view of the system. An up sweep of frequency and a down sweep of frequency may be used to detect a range and velocity of a detected target.

LIDAR systems may utilize high frame rates and an increased number of scanning points which may be achieved, for example, by using multiple numbers of optical sources to emit optical beams. The returned points may be processed to generate a point cloud which may be used to detect targets within the field of view of the LIDAR system. As the number of points being processed increases, the time needed to generate the point cloud may increase. As the frame rate of the LIDAR system increases, the time available to process a particular frame to generate the point cloud may decrease.

SUMMARY

The present disclosure describes examples of systems and methods for processing data points of a LIDAR system using point indices to generate a point cloud.

According to some embodiments of the present disclosure, a light detection and ranging (LIDAR) system includes an optical receiver to generate a plurality of data points associated with one or more return beams from a target of the LIDAR system, a processor, and a memory to store the plurality of data points and store instructions. The instructions, when executed by the processor, cause the LIDAR system to: generate a first index to a first memory location of a first stored value associated with a first data point, from the plurality of data points, and a second index to a second memory location of second stored value associated with a second data point, from the plurality of data points; using the first and second indices as input, perform a first processing operation to determine whether to modify the first data point, using the second data point, to produce a new data point; and provided the first processing operation determines that a first comparison between the first stored value and the second stored value satisfies a first set of criteria: communicate the first and second indices as input to a second processing operation to determine whether to modify the first data point, using a third data point, to produce the new data point, wherein the first index identifies the first stored value and the second index is adjusted by the second processing operation to identify a third stored value, related to the third data point, stored at a third memory location; and provided the second processing operation determines that a second comparison between the first stored value and the third stored value satisfies a second set of criteria that is different from the first set of criteria: retrieve, using the first index, the first stored value to produce a first portion of the new data point for storage within a point cloud; and retrieve, using the second index, the third stored value to produce a second portion of the new data point for storage within the point cloud.

In some embodiments, the processor is further to: provided the first processing operation determines that the first comparison between the first stored value and the second stored value does not satisfy the first set of criteria: select a fourth data point, from the plurality of data points, that is associated with a fourth stored value; and provided the first processing operation determines that a third comparison between the first stored value and the fourth stored value satisfies the first set of criteria, adjust the second index to identify the fourth stored value and communicate the first and second indices to the second processing operation.

In some embodiments, the processor is further to: communicate the first and second indices as input to a third processing operation to determine whether to modify the first data point, using a fourth data point, to produce the new data point, wherein the first index identifies the first stored value and the second index is adjusted by the third processing operation to identify a fourth stored value, related to the fourth data point, stored at a fourth memory location; and provided the third processing operation determines that a third comparison between the first stored value and the fourth stored value satisfies a third set of criteria, different from the first set of criteria and the third set of criteria: retrieve, using the first index, the first stored value to produce the first portion of the new data point for storage within the point cloud; and retrieve, using the second index, the fourth stored value to produce the second portion of the new data point for storage within the point cloud.

In some embodiments, the first set of criteria comprises at least one of: a signal-to-noise (SNR) ratio, an intensity threshold, a chirp point position threshold, data representing a spatial location of the target, first metadata describing the spatial location of the target, or second metadata describing acquisition of the spatial location of the target.

In some embodiments, the first, second, and third memory locations comprise different memory addresses within a static random access memory (SRAM).

In some embodiments, the first processing operation and the second processing operation are performed without modifying data stored at the first and second memory locations of the first data point and the second data point.

In some embodiments, the processor is further to: calculate a range and a velocity of the target based on the point cloud, wherein the point cloud comprises the plurality of data points and the new data point.

In some embodiments, the LIDAR system comprises a frequency-modulated continuous-wave (FMCW) LIDAR system.

According to some embodiments of the present disclosure, a method of operating a light detection and ranging (LIDAR) system, includes: generating a first index to a first memory location of a first stored value associated with a first data point, from a plurality of data points associated with a target of the LIDAR system, and a second index to a second memory location of second stored value associated with a second data point, from the plurality of data points; using the first and second indices as input, perform a first processing operation to determine whether to modify the first data point, using the second data point, to produce a new data point; and provided the first processing operation determines that a first comparison between the first stored value and the second stored value satisfies a first set of criteria: communicate the first and second indices as input to a second processing operation to determine whether to modify the first data point, using a third data point, to produce the new data point, wherein the first index identifies the first stored value and the second index is adjusted by the second processing operation to identify a third stored value, related to the third data point, stored at a third memory location; and provided the second processing operation determines that a second comparison between the first stored value and the third stored value satisfies a second set of criteria that is different from the first set of criteria: retrieve, using the first index, the first stored value to produce a first portion of the new data point for storage within a point cloud; and retrieve, using the second index, the third stored value to produce a second portion of the new data point for storage within the point cloud.

In some embodiments, the method further includes provided the first processing operation determines that the first comparison between the first stored value and the second stored value does not satisfy the first set of criteria: selecting a fourth data point, from the plurality of data points, that is associated with a fourth stored value; and provided the first processing operation determines that a third comparison between the first stored value and the fourth stored value satisfies the first set of criteria, adjusting the second index to identify the fourth stored value and communicate the first and second indices to the second processing operation.

In some embodiments, the method further includes: communicating the first and second indices as input to a third processing operation to determine whether to modify the first data point, using a fourth data point, to produce the new data point, wherein the first index identifies the first stored value and the second index is adjusted by the third processing operation to identify a fourth stored value, related to the fourth data point, stored at a fourth memory location; and provided the third processing operation determines that a third comparison between the first stored value and the fourth stored value satisfies a third set of criteria, different from the first set of criteria and the third set of criteria: retrieving, using the first index, the first stored value to produce the first portion of the new data point for storage within the point cloud; and retrieving, using the second index, the fourth stored value to produce the second portion of the new data point for storage within the point cloud.

In some embodiments, the first set of criteria comprises at least one of: a signal-to-noise (SNR) ratio, an intensity threshold, a chirp point position threshold, data representing a spatial location of the target, first metadata describing the spatial location of the target, or second metadata describing acquisition of the spatial location of the target.

In some embodiments, the first processing operation and the second processing operation are performed without modifying data stored at the first and second memory locations of the first data point and the second data point.

In some embodiments, the method further includes: calculating a range and a velocity of the target based on the point cloud, wherein the point cloud comprises the plurality of data points and the new data point.

According to some embodiments of the present disclosure, a non-transitory computer-readable storage medium including instructions that, when executed by a processor, cause the processor to: generate a first index to a first memory location of a first stored value associated with a first data point, from a plurality of data points associated with a target of a light detection and ranging (LIDAR) system, and a second index to a second memory location of second stored value associated with a second data point, from the plurality of data points; using the first and second indices as input, perform a first processing operation to determine whether to modify the first data point, using the second data point, to produce a new data point; and provided the first processing operation determines that a first comparison between the first stored value and the second stored value satisfies a first set of criteria: communicate the first and second indices as input to a second processing operation to determine whether to modify the first data point, using a third data point, to produce the new data point, wherein the first index identifies the first stored value and the second index is adjusted by the second processing operation to identify a third stored value, related to the third data point, stored at a third memory location; and provided the second processing operation determines that a second comparison between the first stored value and the third stored value satisfies a second set of criteria that is different from the first set of criteria: retrieve, using the first index, the first stored value to produce a first portion of the new data point for storage within a point cloud; and retrieve, using the second index, the third stored value to produce a second portion of the new data point for storage within the point cloud.

In some embodiments, the processor is further to: provided the first processing operation determines that the first comparison between the first stored value and the second stored value does not satisfy the first set of criteria: select a fourth data point, from the plurality of data points, that is associated with a fourth stored value; and provided the first processing operation determines that a third comparison between the first stored value and the fourth stored value satisfies the first set of criteria, adjust the second index to identify the fourth stored value and communicate the first and second indices to the second processing operation.

In some embodiments, the processor is further to: communicate the first and second indices as input to a third processing operation to determine whether to modify the first data point, using a fourth data point, to produce the new data point, wherein the first index identifies the first stored value and the second index is adjusted by the third processing operation to identify a fourth stored value, related to the fourth data point, stored at a fourth memory location; and provided the third processing operation determines that a third comparison between the first stored value and the fourth stored value satisfies a third set of criteria, different from the first set of criteria and the third set of criteria: retrieve, using the first index, the first stored value to produce the first portion of the new data point for storage within the point cloud; and retrieve, using the second index, the fourth stored value to produce the second portion of the new data point for storage within the point cloud.

In some embodiments, the first set of criteria comprises at least one of: a signal-to-noise (SNR) ratio, an intensity threshold, a chirp point position threshold, data representing a spatial location of the target, first metadata describing the spatial location of the target, or second metadata describing acquisition of the spatial location of the target.

In some embodiments, the processor is further to: calculate a range and a velocity of the target based on the point cloud, wherein the point cloud comprises the plurality of data points and the new data point.

BRIEF DESCRIPTION OF THE DRAWINGS

For a more complete understanding of the various examples, reference is now made to the following detailed description taken in connection with the accompanying drawings in which like identifiers correspond to like elements.

FIG. 9 is a flow diagram of a method for operating a LIDAR system, in accordance with some embodiments of the present disclosure.

DETAILED DESCRIPTION

Figure 1:
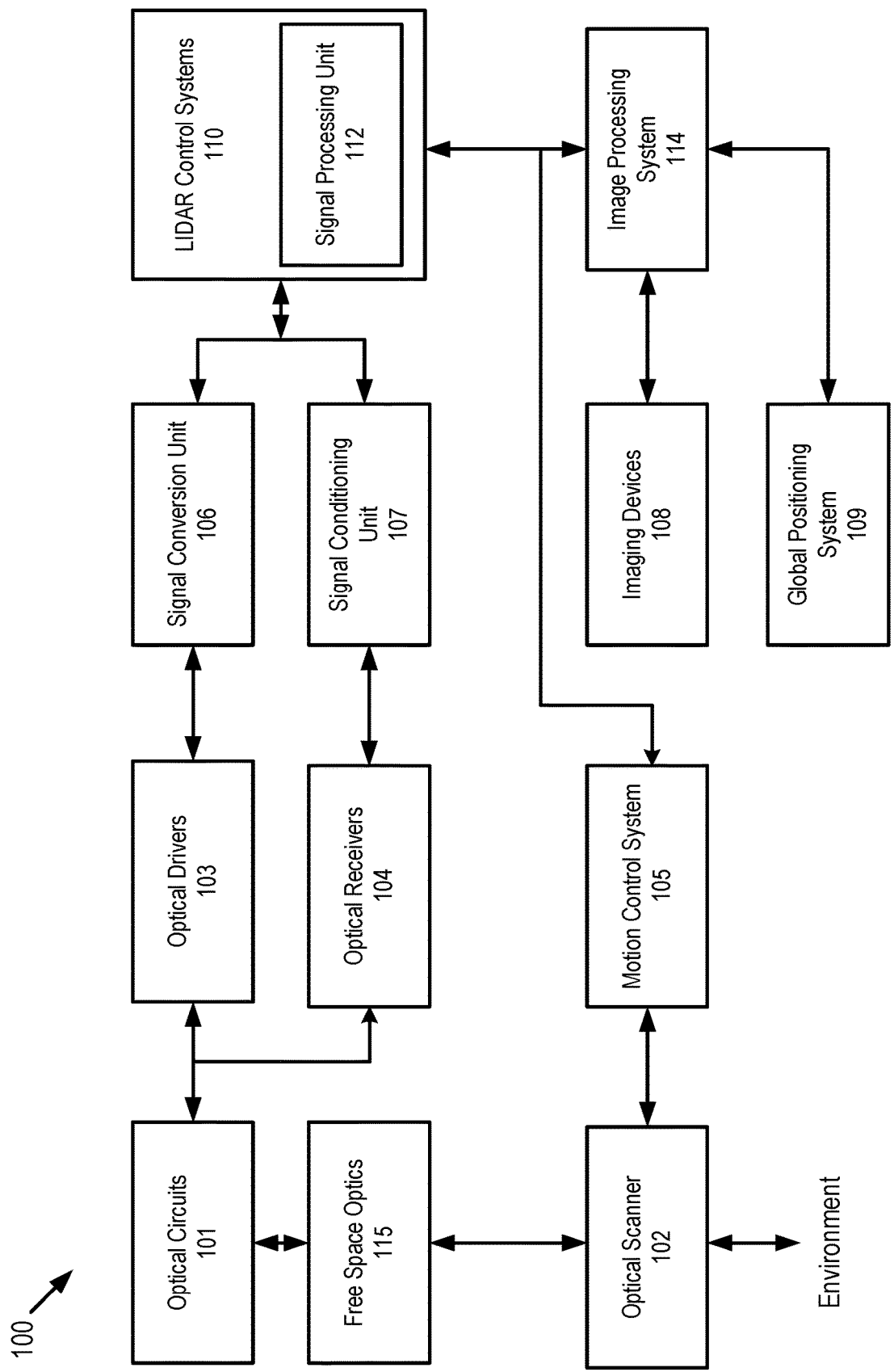
FIG. 1 is a block diagram of an example LIDAR system according to some embodiments of the present disclosure.

The present disclosure describes various examples of LIDAR systems and methods for detecting distance and relative speed of objects. More specifically, the present disclosure describes improved techniques for performing point processing of points returned from optical beams of a LIDAR system to detect the distance and speed of the objects.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely examples. Particular implementations may vary from these example details and still be contemplated to be within the spirit and scope of the embodiments.

The present disclosure describes various examples of LIDAR systems and methods for point processing related to target detection. According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency-modulated continuous-wave (FMCW) device that assists with spatial awareness for automated driver assist systems, or self-driving vehicles.

As discussed above, conventional LIDAR systems may utilize high frame rates and an increased number of scanning points. For example, for a large number of scanning lines per second, multiple optical beams may be used in a LIDAR system to allow for multiple lines to be scanned simultaneously.

However, some LIDAR system have finite amounts of processing capability, power, and/or space, each, or all, of which may be impacted by increased frame rates and/or an increased number of scanning points. For example, as the number of points returned in a LIDAR system increases, the processing time needed to process the points increases. More points may mean more processing time, which may hamper an ability of the LIDAR system to generate a point cloud in a timely fashion. Similarly, an increased frame rate may result in less time between frames in which to process points to generate a point cloud, which may be hampered by the processing speed of the LIDAR system. In addition, it may be beneficial for a LIDAR system to be relatively compact. This may reduce the availability (or desirability) of higher powered (or more) processors that might otherwise be utilized to provide increased processing.

In addition, it may be beneficial to reduce the amount of memory utilized by the LIDAR system. The types of operations utilized to process data points of a LIDAR system may perform various types of manipulations of the data associated with the scanning points, and the data may, in systems not benefiting from embodiments of the present disclosure, utilize intermediate data storage within the LIDAR system. As the number of points being scanned increases and/or a frame rate increases, the amount of memory utilized for generating a point cloud in these systems may increase, which may increase a cost of the LIDAR system and/or an amount of space needed for the LIDAR system, both of which may be undesirable.

Moreover, the types of operations utilized to process data points in systems not benefiting from embodiments of the present disclosure may utilize large amounts of memory manipulation. This may result in increased power utilized by the LIDAR system to support the memory operations. As the number of points being scanned increases and/or a frame rate increases, the power utilized to process points returned by the LIDAR system in these systems may increase. Increased power utilization may result in an increased need for cooling, increased spacing requirements, and/or increased costs to provide sufficient power for the LIDAR system.

The present disclosure addresses the above issues associated with point processing by using an improved point replacement system as part of its point processing operations. Respective operations of the LIDAR system may perform processing operations to determine whether to replace all or a portion of a first point with that of another point. A plurality of processing operations may be utilized, each assessing a given point with respect to one or more criteria. References to the data points may be transferred between the processing operations using indices, which may refer to memory locations of the data points.

The processing operations may identify one of the plurality of data points that may be used to modify a given data point (e.g., based on one or more of the criteria) but may, in some embodiments, avoid updating the point in memory.

Instead, an index to the original point and an index to a point used to modify the original point may be passed to the next processing operation. The next processing operation may perform further operations on the original point, and may further select a different data point with which to modify the original point. The plurality of processing operations may be (e.g., sequentially) executed to arrive at a determination as to which of the plurality of points (if any) is selected to modify the original point. This determined point may be used to modify the original point for the purpose of generating a point cloud.

In some embodiments, the use of the indices to identify the points being manipulated may reduce the amount of memory operations that are performed as part of the processing of the point cloud. This may result in a reduction of power as well as an increase in the processing speed of the point processing. In addition, since the processing is focused on identifying a replacement for a given point, the number of operations, as well as the amount of data that is to be passed between processing operations, is reduced. This increases a processing time of the point generation process without utilizing increased processing resources or increased power. Thus, embodiments according to the present disclosure provide a technological improvement that results in an increased processing capacity for a given set of processing resources, as well as a reduced power consumption.

FIG. 1 is a block diagram of an example LIDAR system 100 according to some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, which may be a modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to a collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using analog-to-digital converters (ADCs). The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system may also process satellite-based navigation location data to provide a precise global location.

Figure 2:
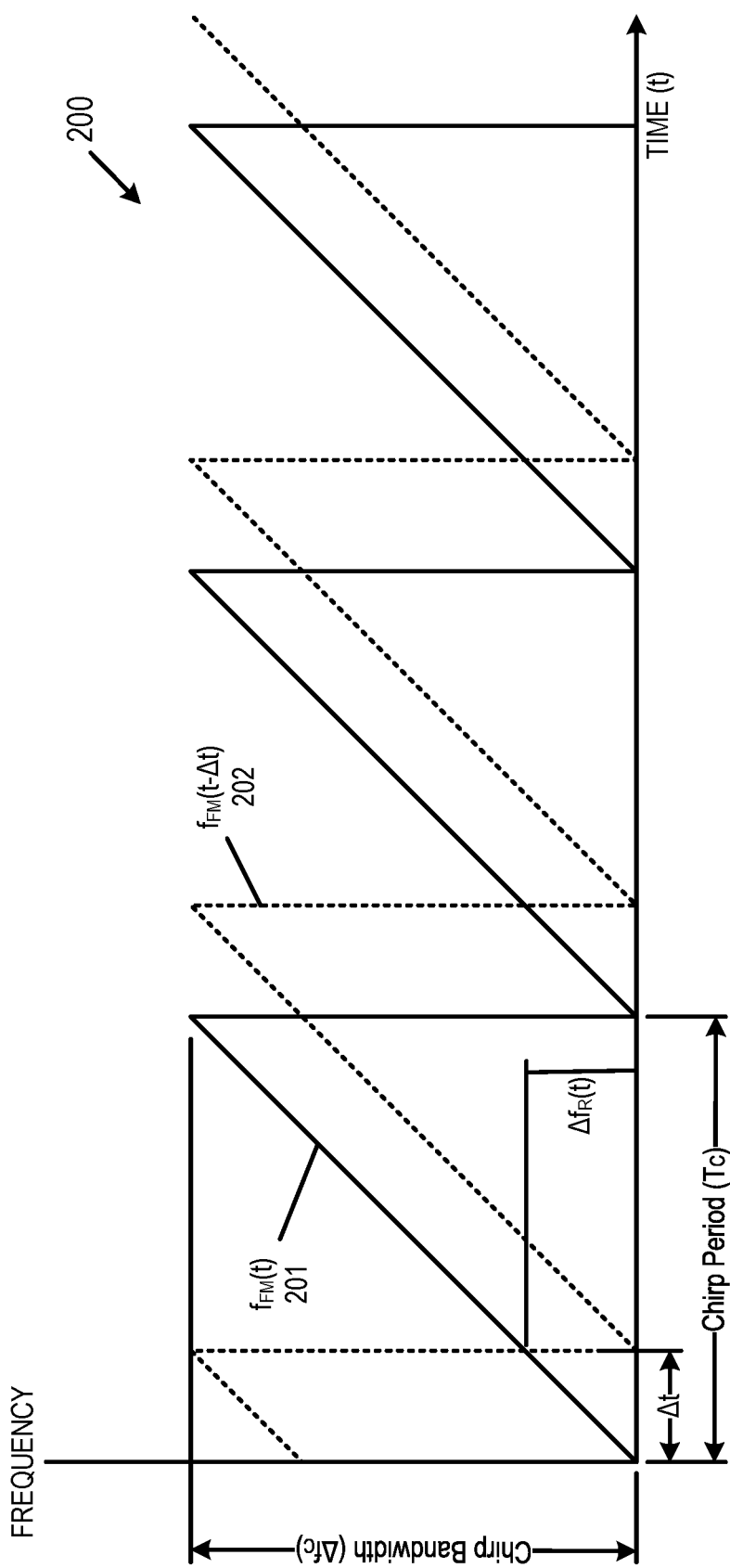
FIG. 2 is a time-frequency diagram of FMCW scanning signals that can be used by a LiDAR system according to some embodiments of the present disclosure.

FIG. 2 is a time-frequency diagram of FMCW scanning signals that can be used by a LIDAR system according to some embodiments of the present disclosure. The FMCW scanning signals 201 and 202 may be used in any suitable LIDAR system, including the LIDAR system 100 of FIG. 1, to scan a target environment. The scanning signal 201 may be a triangular waveform with an up-chirp and a down-chirp having a same bandwidth $\Delta f_S$ and period $T_S$. The other scanning signal 202 is also a triangular waveform that includes an up-chirp and a down-chirp with bandwidth $\Delta f_S$ and period $T_S$. However, the two signals are inverted versions of one another such that the up-chirp on scanning signal 201 occurs in unison with the down-chirp on scanning signal 202.

FIG. 2 is a time-frequency diagram 200 of an FMCW scanning signal 201 that may be used by a LIDAR system, such as the LIDAR system 100, to scan a target environment according to some embodiments. In one example, the FMCW scanning signal 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the FMCW scanning signal 201, where $\Delta t$ is the round trip time to and from a target illuminated by FMCW scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the target return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of LIDAR system 100. The beat frequency $\Delta f_R(t)$ can then be digitized by an analog-to-digital converter (ADC) 302, for example, in a signal conditioning unit such as signal conditioning unit 107 in the LIDAR system 100. The digitized beat frequency signal can then be digitally processed, for example, in a signal processing unit, such as signal processing unit 112 in the LIDAR system 100. It should be noted that the target return signal 202 will, in general, also include a frequency offset (Doppler shift) if the target has a velocity relative to the LIDAR system 100. The Doppler shift can be determined separately, and used to correct the frequency of the return signal 202, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_R$max) is 500 megahertz. This limit in turn determines the maximum range of the system as Rmax=(c/2)($\Delta f_R$max/k) which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
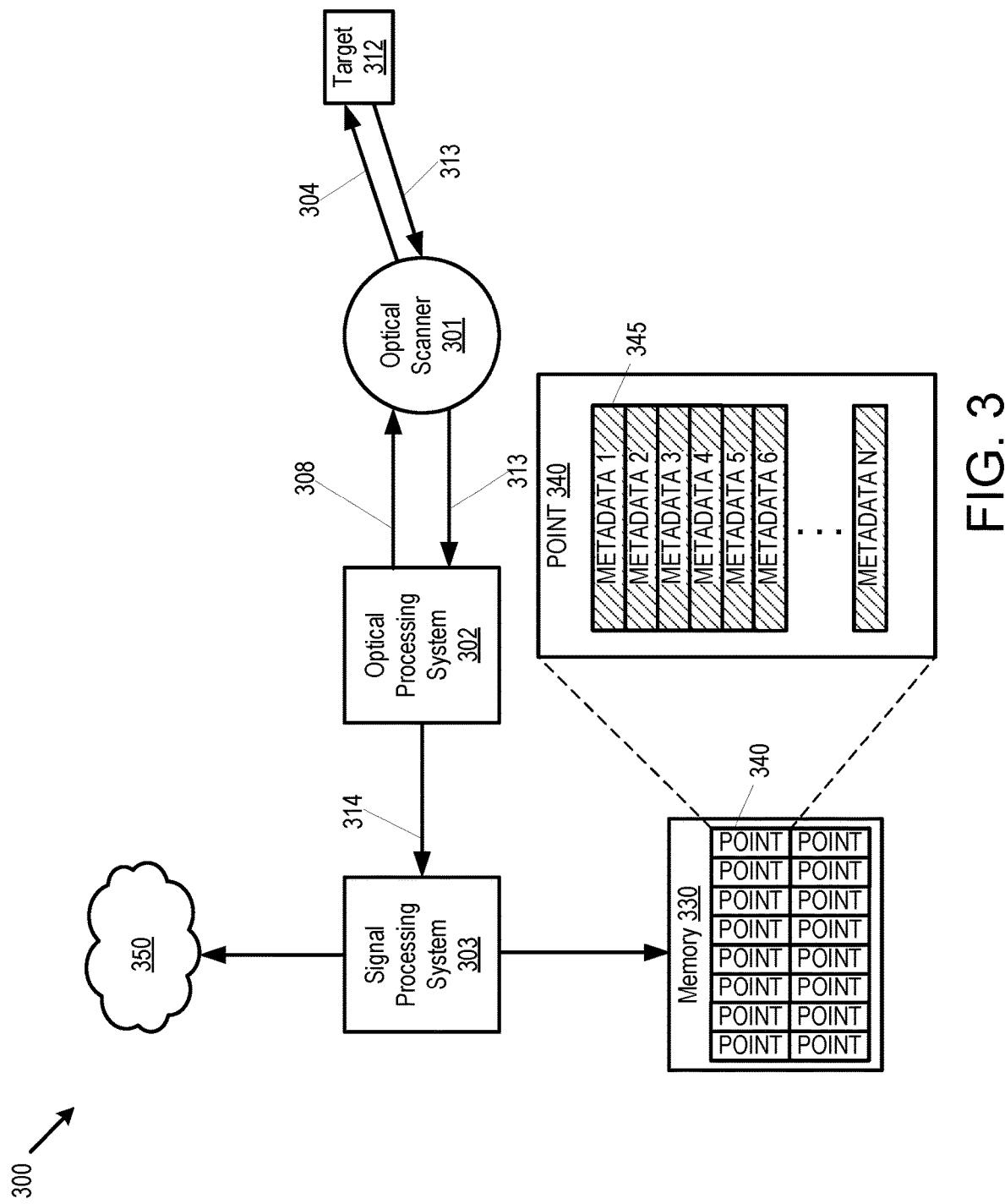
FIG. 3 is a block diagram illustrating an example LIDAR system according to some embodiments of the present disclosure.

FIG. 3 is a block diagram illustrating an example LIDAR system 300 according to some embodiments of the present disclosure. Example LIDAR system 300 includes an optical scanner 301 to transmit a frequency-modulated continuous wave optical scanning beam 304 to targets such as target 312 and to receive a return signal 313 from reflections of the optical scanning beam 304 from the targets in the field of view (FOV) of the optical scanner 301. LIDAR system 300 also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100. LIDAR system 300 also includes a signal processing system 303 to measure energy of the baseband signal 314 in the frequency domain, to compare the energy to an estimate of LIDAR system noise, and to determine a likelihood that a signal peak in the frequency domain indicates a detected target. Signal processing system 303 may include elements of signal conversion unit 106, signal conditioning unit 107, LIDAR control systems 110 and signal processing unit 112 in LIDAR system 100.

In some embodiments, optical scanner 301 is configured to scan a target environment with the optical scanning beam 304 through a range of azimuth and elevation angles covering the FOV of the LIDAR system 300. In some embodiments, the optical scanning beam 304 may include a plurality of individual optical beams 308 that are collimated together and directed to optical scanner 301 to generate the scanning beam 304. The plurality of optical beams 308 may allow for a plurality of scan points to be returned through the range of azimuth and elevation angles covered by the optical scanner 301. In order to collimate the plurality of optical beams 308, a beam collimator, such as a collimating lens, may be used to collimate individual ones of the optical beams 308 to generate the optical scanning beam 304.

As a result of processing the baseband signal 314 from the return beam 313, the signal processing system 303 may generate a plurality of data points 340 (also referred to herein as points). Each of the points 340 may represent a return value associated with an optical signal returned from the target 312 in the FOV. The LIDAR system 300 may generate a point cloud 350 from the points 340. The point cloud 350 may be a digital representation of the target(s) 312 within the FOV of the LIDAR system 300 as detected based on the multiple return beams 313 received from the FOV.

The point cloud 350 and/or the point 340 may be a digital object that may be stored, for example, in a memory 330.

Memory 330 may include volatile memory devices (e.g., random access memory (RAM)), non-volatile memory devices (e.g., flash memory) and/or other types of memory devices. In some embodiments, memory 330 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 330 may be configured for long-term storage of data and may retain data between power on/off cycles of the LIDAR system 300. In some embodiments, the memory 330 may be a static random access memory (SRAM), though the embodiments of the present disclosure are not limited to such a configuration.

The point 340 may contain one or more metadata 345. For example, FIG. 3 illustrates representative metadata 345 that includes metadata 1 to metadata N, as an example embodiment of a point 340. The metadata 345 may describe and/or represent a spatial location of a portion of the target 312 detected by at least one of the scanning beams 304. In addition to information about the estimated location (e.g., an X, a Y, and/or a Z coordinate within the FOV, a velocity associated with the point, etc.) of the portion of the target 312, the metadata 345 may also contain information that describes the spatial location (e.g., an intensity of the light detected by the LIDAR system 300, a timestamp, etc.) as well as information related to the acquisition of the point 340 (e.g., data associated with the LIDAR system 300 at the time of the acquisition of the point 340, an azimuth of the point collection, an elevation of the point collection, a data packet associated with the point 340, whether the point 340 was interpolated, etc.). In some embodiments, the point 340 may contain 256 bytes or more of data.

As will be discussed further herein, as part of the signal processing system 303, a plurality of points 340 detected from the return beams 313 may be processed to selectively incorporate the points 340 into the point cloud 350. As part of processing the points 340, some of the points 340 may be altered or discarded. As would be understood by one of ordinary skill in the art, some of the points 340 detected from the return beam 313 may be less desirable for processing by one or more components of the signal processing system 303. For example, a point 340 may have a low signal-to-noise (SNR) ratio or other deficiencies that may render it less useful for generating the point cloud 350. In some embodiments, the signal processing system 303 may detect the defect within the point 340, and either discard the point 340 or alter the point 340. In some embodiments, one or more of the metadata 345 of a defective and/or suboptimal point 340 may be replaced by other metadata to correct the defect. In some embodiments, the one or more of the metadata 345 of the defective and/or suboptimal point 340 may be replaced using metadata taken from other ones of the points 340, as will be discussed further herein.

In some scenarios, the processing of the metadata 345 of the points 340 can generate additional complexity. To correct a defective and/or suboptimal point 340, the signal processing system 303 may update the memory 330. For example, the signal processing system 303 may update the memory 330 in order to update the metadata 345 of one or more points 340. This may cause issues for a typical LIDAR system.

For instance, the access to the memory 330 may utilize additional processing time. As more points 340 of the point cloud 350 are processed, the amount of time that must be taken for these updates may increase. The LIDAR system 300 may be configured to generate the point cloud 350 for each frame. A frame may represent a digital "snapshot" of scenes that include the target 312 at a particular time and stored in computer memory resident on the LIDAR systems described herein. As the frame rate of the LIDAR system 300 increases, the number of frames to be processed in a given timeframe (e.g. per second) increases, which may decrease the amount of time available to generate the point cloud 350 for a given frame. To the extent the memory operations used to modify the point 340 take additional time, they may complicate increasing the frame rate of the LIDAR system 300. While it may be possible to increase the speed of the memory 330, this can cause additional cost.

Also, as the access to memory 330 increases during processing of the points 340, a power consumption of the LIDAR system 300 may correspondingly increase. An increase in power consumption may be detrimental to a LIDAR system 300, as LIDAR systems may benefit from a smaller size and/or lower power consumption, so as to be useful in applications such as autonomous driving.

Moreover, as will be discussed in more detail herein, the processing performed by the signal processing system 303 may include a number of separate operations. For example, a point 340 may undergo a number of different types of analyses, each of which may determine whether the point 340 is to be modified for improvement. Thus, if each processing operation were to modify the point 340, the number of modifications would increase, thus exacerbating the problems discussed above. As will be described further herein, the LIDAR system 300 addresses these and other challenges by utilizing indices during point processing.

Figure 4:
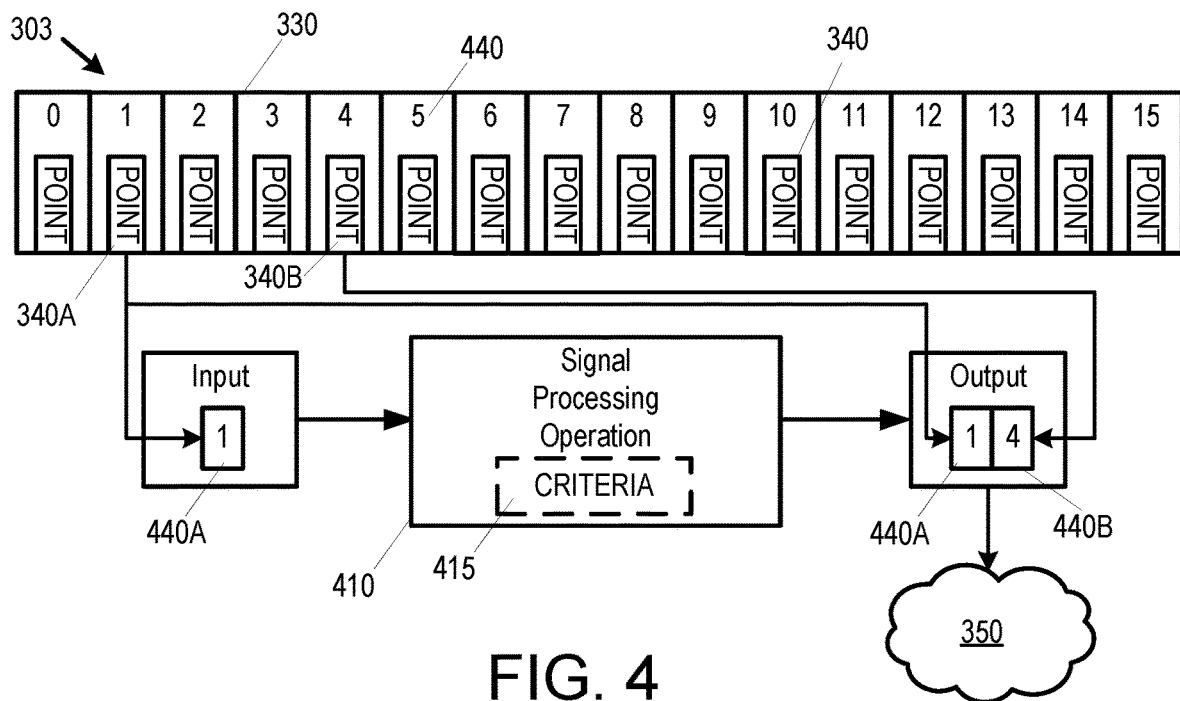
FIG. 4 is a schematic diagram illustrating an example signal processing system, according to some embodiments of the present disclosure.

FIG. 4 is a schematic diagram illustrating an example signal processing system 303, according to some embodiments of the present disclosure. A description of elements of FIG. 4 that have been previously discussed will be omitted for brevity.

Referring to FIG. 4, the signal processing system 303 may include at least one signal processing operation 410. The signal processing operation 410 may be configured to operate on points 340 within memory 330. The signal processing operation 410 may evaluate the points 340 utilizing indices 440. The indices 440 may represent addresses (e.g., physical or virtual address) of locations in the memory 330. For example, the indices 440 may represent an offset from a starting address of the memory 330. In some embodiments, an index 440 for a given memory address may be formed from one or more most significant bits of the memory address. In some embodiments, each of the points 340 may be associated with a unique index 440.

In some embodiments, an input to the signal processing operation 410 may be a first index 440A. The first index 440A may refer to and/or point to a memory location in memory 330 containing a first point 340A to be processed by the signal processing operation 410. These references between the indices 440 (e.g., the first index 440A) and the memory locations are illustrated utilizing arrows in FIG. 4. In FIG. 4, for example, the input to the signal processing operation 410 is illustrated as a first index 440A '1', though this is only an example. The signal processing operation 410 may utilize the first index 440A to access the memory 330 to retrieve the data associated with the first point 340A to be processed (e.g., the first point 340A stored in memory 330 at a memory location indicated by the first index 440A).

As part of the signal processing operation 410, the first point 340A associated with the first index 440A may be analyzed to determine if the first point 340A is to be included in the to-be-constructed point cloud 350. When initially received, some points 340 may reflect valuable data regarding a target in the field of view, and some of the points 340 may be too noisy. Thus, some of the points 340 may not represent well the target they were supposed to represent. However, as recognized by the inventors, there may be some correlation between the points 340. As a result, in some cases, neighboring points 340 may still contain valuable data that may be utilized to improve the first point 340A to generate the point cloud 350.

The first point 340A associated with the first index 440A provided to the signal processing operation 410 may be compared to one or more criteria 415. The one or more criteria 415 may represent some characteristic of a point 340 that allows it to be included within the point cloud 350. Some examples of criteria 415 include a signal-to-noise (SNR) ratio, an intensity threshold, a chirp point position threshold, data representing a spatial location of the target, data describing the spatial location of the target, and/or data describing acquisition of the spatial location of the target. In some embodiments, the comparison to the criteria 415 may be performed based on, or generated from, metadata 345 of the point 340 (see FIG. 3). For example, in some embodiments, the signal processing operation 410 may retrieve and/or generate an SNR for the point 340 using the first index 440A. The SNR of the point 340 may be analyzed to determine if the SNR satisfies the criteria 415 of the signal processing operation 410.

If the first point 340A represented by the first index 440A does not satisfy the criteria 415, the signal processing operation 410 may analyze the other points 340 within memory 330 to determine if the first point 340A represented by the first index 440A could be modified using one of the other points 340 to satisfy the criteria 415. For example, the signal processing operation 410 may determine that one or more pieces of metadata 345 of a second point 340B may be used to modify the metadata 345 of the first point 340A represented by the first index 440A so as to meet the criteria 415.

As an example, the signal processing operation 410 may determine that the SNR of the first point 340A represented by the first index 440A is not sufficient to satisfy the criteria 415 of the signal processing operation 410. The signal processing operation 410 may determine, however, that if the first point 340A represented by the first index 440A were modified using the second point 340B, it would satisfy the criteria 415 (e.g., have a high enough SNR). The signal processing operation 410 may select the second point 340B with which to modify the first point 340A represented by the first index 440A, and may generate a second index 440B to represent this second point 340B. In FIG. 4, for example, it is illustrated that the signal processing operation selects the second point 340B at a second index '4' as a modifier for the first point 340A.

The signal processing operation 410 may output the first index 440A and the second index 440B as output of the signal processing operation 410. The first index 440A that is output is the original first index 440A that was input to the signal processing operation 410. The second index 440B is an index 440 to the second point 340B that was selected to modify the first point 340A represented by the first index 440A. The second index 440B may be referred to as a modified index 440B. Thus, the signal processing operation 410 may output an original index 440A (e.g., the first index 440A) and a modified index 440B (e.g., the second index 440B). The modified index 440B points to and/or indicates the second point 340B in memory 330 that the signal processing operation 410 has selected to modify the first point 340A represented by the first index 440A so as to meet the criteria 415.

Using the first index 440A and the second index 440B, the signal processing system 303 may modify the first point 340A represented by the first index 440A using the second point 340B represented by the second index 440B to generate an as-modified point 340. The as-modified point 340 may then be used to generate the point cloud 350. In this way, the as-modified point 340 may be of higher quality than the original first point 340A, and may result in an improved point cloud 350.

Embodiments of the present disclosure may allow for a signal processing operation 410 that can manipulate points 340 without copying the data of the point 340. The point 340, even when selected for modification, may remain stored in memory 330. Instead, indices 440 to the memory 330 are utilized. The point 340 itself may not be modified until the point is reconstructed using the modified index 440B. At that time, the memory 330 may be accessed and the point 340 may be updated memory 330. This may result in only a single write to memory 330 rather than multiple writes that might be present if the point 340 were copied as part of the operations.

Figure 5:
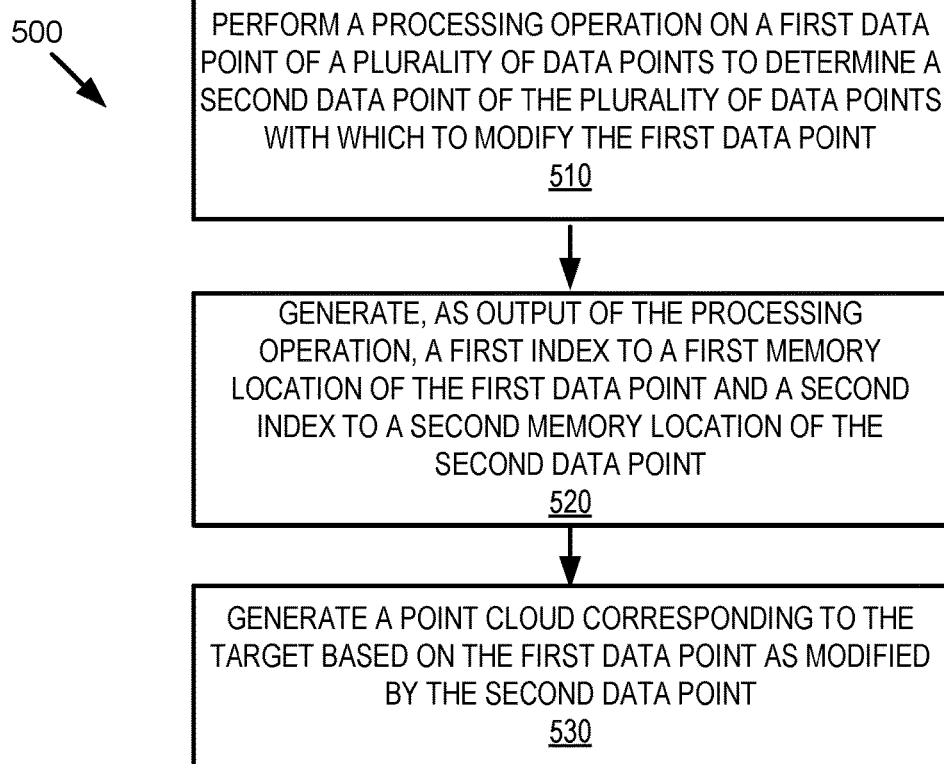
FIG. 5 is a flow diagram of a method for operating a LIDAR system, in accordance with some embodiments of the present disclosure.

FIG. 5 is a flow diagram of a method 500 for operating a LIDAR system 300, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of the method 700 may be performed by a computing device (e e.g., LIDAR control systems 110 and/or signal processing system 303 described herein). In some embodiments, the LIDAR system comprises a frequency-modulated continuous-wave (FMCW) LIDAR system.

Referring simultaneously to the previous figures as well, the method 500 begins at block 510, in which a processing operation is performed on a first data point of a plurality of data points to determine a second data point of the plurality of data points with which to modify the first data point. In some embodiments, the plurality of points may be similar to points 340 described herein. The signal processing operation may be similar to signal processing operation 410 described herein.

In some embodiments, determining the second data point of the plurality of data points with which to modify the first data point may be based on at least one of: a signal-to-noise (SNR) ratio, an intensity threshold, a chirp point position threshold, data representing a spatial location of the target, first metadata describing the spatial location of the target, or second metadata describing acquisition of the spatial location of the target.

At block 520, a first index to a first memory location of the first data point and a second index to a second memory location of the second data point are generated as output of the processing operation. In some embodiments, the first and second indices are similar to the first and second indices 440A, 440B described herein. In some embodiments, the first and second memory locations are locations within an SRAM.

At block 530, a point cloud is generated corresponding to the target based on the first data point as modified by the second data point. In some embodiments, the point cloud is similar to the point cloud 350 described herein. In some embodiments, the processing operation is performed without modifying data stored at the first and second memory locations of the first data point and the second data point.

In some embodiments, generating the point cloud corresponding to the target based on the first data point as modified by the second data point, comprises generating a new data point based on a first portion of the first data point and a second portion of the second data point.

Figure 6:
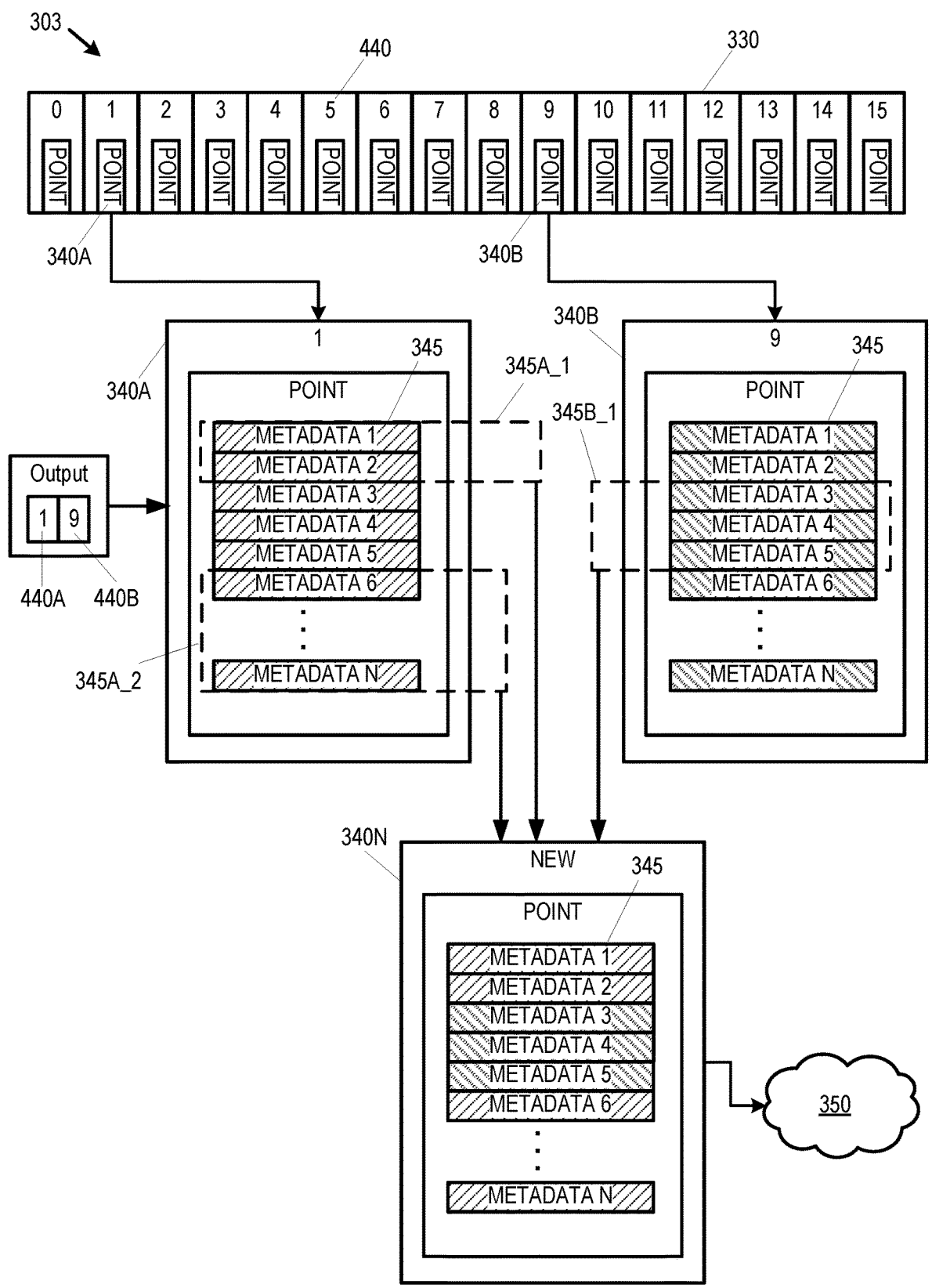
FIG. 6 is a block diagram illustrating an example of modifying a first point utilizing a second point, according to some embodiments of the present disclosure.

As discussed herein, a point 340 may be reconstructed and/or improved based on the contents of another point 340. FIG. 6 is a block diagram illustrating an example of modifying a first point 340A utilizing a second point 340B, according to some embodiments of the present disclosure. In FIG. 6, a description of elements described with respect to other figures will be omitted for brevity.

Referring to FIG. 6, a signal processing system 303 may include memory 330 containing a plurality of data points 340 (e.g., as collected based on a return beam of a LIDAR system). Indices 440 may be generated to reference respective ones of the points 340.

As previously described, one or more processing operations (e.g., processing operation 410 of FIG. 4) may analyze the points 340 to determine if they are suitable for using to generate a point cloud 350. As part of the processing operation, a first index 440A and a second index 440B may be generated. The first index 440A may refer to a first point 340A within the memory 330, and the second index 440B may refer to a second point 340B within the memory 330. The processing operation may determine that the first point 340A indicated by the first index 440A should be modified based on the second point 340B indicated by the second index 440B.

To modify the first point 340A, the signal processing system 303 may utilize the first index 440A to access the memory 330 to view and/or analyze the metadata 345 of the first point 340A. As part of the analysis, the metadata 345 of the first point 340A and the metadata 345 of the second point 340B may both be utilized to generate a new point 340N. In some embodiments, the metadata 345 of the new point 340N may be different from the metadata 345 of both the first point 340A and the second point 340B.

For example, the signal processing system 303 may form the new point 340N by copying one or more portions 345A_1, 345A_2 of the first point 340A into the metadata 345 of the new point 340N. Similarly, the signal processing system 303 may copy one or more portions 345B_1 of the second point 340B into the metadata 345 of the new point 340N. In this way, metadata 345 of the first point 340A that are defective or otherwise unsuitable for use in forming the point cloud 350 may be repaired or otherwise improved by using the metadata 345 of the second point 340B. In some embodiments, the individual metadata 345 of the first point 340A and the second point 340B may remain intact when copied into the new point 340N, such that the new point 340N may include metadata 345 of the first point 340A and/or metadata 345 of the second point 340B.

While FIG. 6 illustrates the metadata 345 being copying from one of the first point 340A or the second point 340B to form the new point 340N, this is merely an example, and the embodiments of the present disclosure are not limited to such an operation. In some embodiments, the metadata 345 of the new point 340N may be generated based on the metadata 345 of the first point 340A and/or the second point 340B, but may not be an exact copy. For example, the metadata 345 of the new point 340N may be a synthesis formed based on the metadata 345 of the first point 340A and/or the second point 340B. Other methods of modifying the metadata 345 of the first point 340A based on the metadata 345 of the second point 340B will be understood by those of ordinary skill in the art.

After the new point 340N is generated by modifying the first point 340A in view of the second point 340B, it may be used as one of the plurality of points 340 that form the point cloud 350. In some embodiments, the new point 340N may be written back to memory 330 to replace the first point 340A, but the embodiments of the present disclosure are not limited to such a configuration. In some embodiments, the new point 340N may be written to a new storage location within memory 330.

FIG. 6 illustrates a mechanism by which a point 340 referenced by a first index 440A (e.g., an original index 440A) may be modified by a point 340 referenced by a second index 440B (e.g., a modified index 440B) to generate a new point 340N. By analyzing the points 340 and indicating the modification operation to be performed using indices 440, some embodiments of the present disclosure may delay the writing of the memory 330 until the new point 340N is ready to be created. For example, in some embodiments, a number of signal processing operations may be performed, each analyzing the points 340 with respect to different criteria. In some cases, different ones of the signal processing operations may identify different points 340 with which to modify an original point 340. By representing any intermediate operations with indices 440, the amount of data that is copied may be reduced, and writes to memory 330 may be delayed until all, or most, of the operations are complete.

Figure 7A:
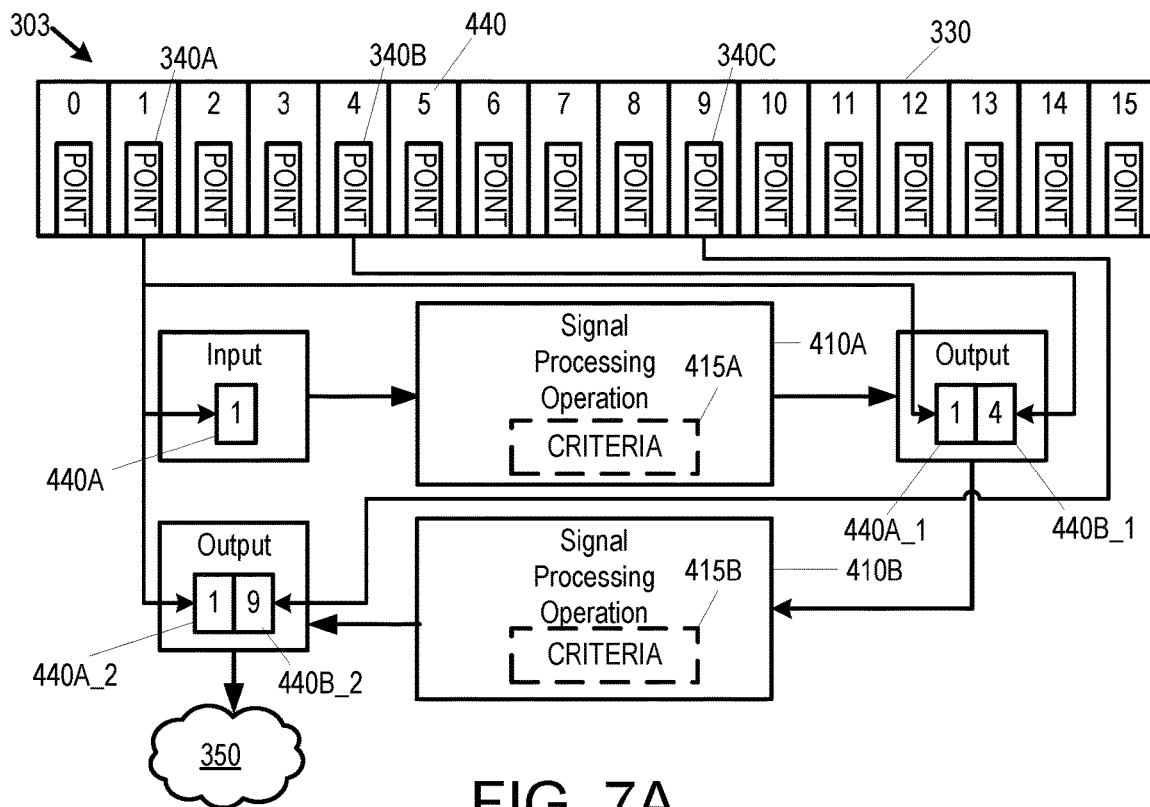
FIG. 7A is a block diagram illustrating the use of two signal processing operations, according to some embodiments of the present disclosure.
Figure 7B:
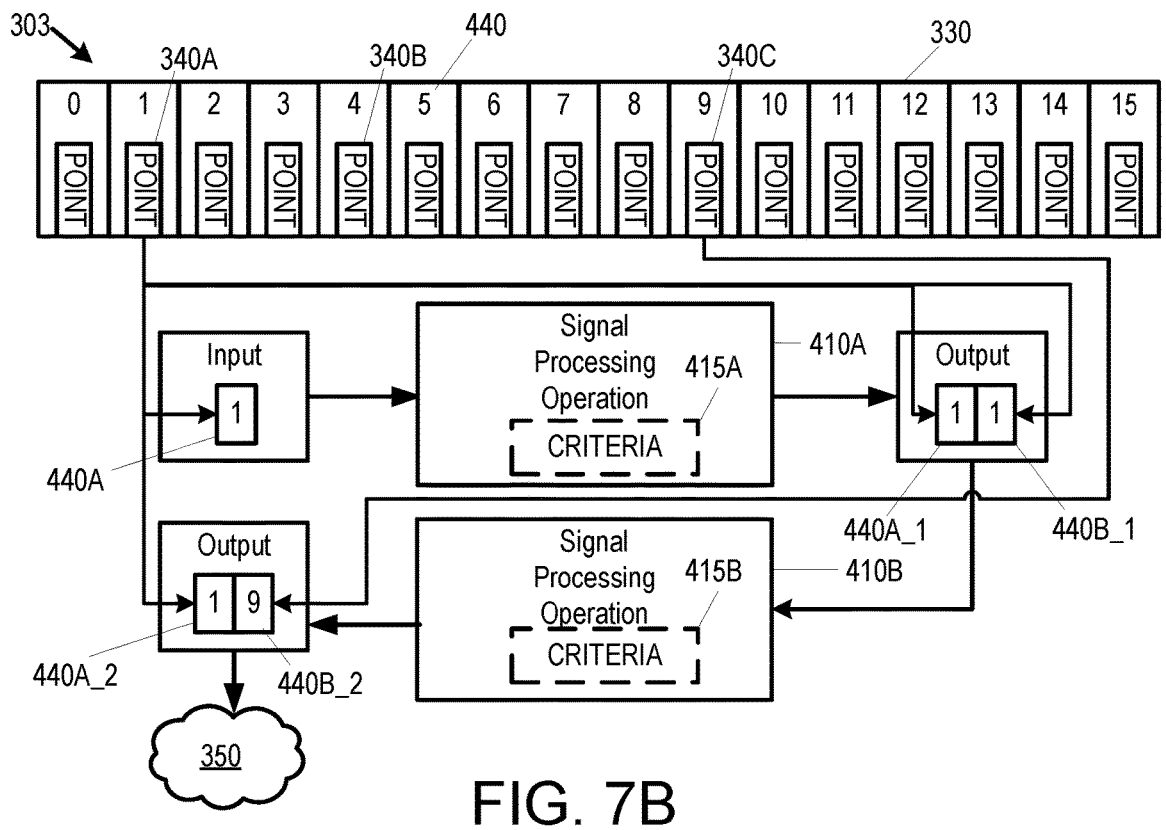
FIG. 7B is a block diagram illustrating the use of two signal processing operations in which the first signal processing operation determines that a first point is not to be modified, according to some embodiments of the present disclosure.

FIGS. 7A and 7B illustrate operations of a signal processing system 303 that incorporates multiple signal processing operations 410, according to some embodiments of the present disclosure. FIG. 7A is a block diagram illustrating the use of two signal processing operations 410A, 410B, according to some embodiments of the present disclosure. FIG. 7B is a block diagram illustrating the use of two signal processing operations 410A, 410B in which the first signal processing operation 410A determines that a first point 340A is not to be modified, according to some embodiments of the present disclosure. In FIGS. 7A and 7B, a description of elements described with respect to other figures will be omitted for brevity.

Referring to FIG. 7A, the signal processing system 303 may incorporate a first signal processing operation 410A followed by a second signal processing operation 410B. The first signal processing operation 410A may analyze the points 340 utilizing a first criteria 415A and the second signal processing operation 410B may analyze the points 340 utilizing a second criteria 415B. In some embodiments, the first criteria 415A may be different from the second criteria 415B. As a non-limiting example, the first signal processing operation 410A may analyze the points 340 with respect to an SNR as the first criteria 415A, and the second signal processing operation 410B may analyze the points 340 with respect to a light intensity as the second criteria 415B. Though FIG. 7A illustrates two signal processing operations 410A, 410B, this is only an example, and the embodiments of the present disclosure are not limited to this configuration.

The first signal processing operation 410A may take a first index 440A as an input. The first index 440A may point to and/or reference a first point 340A at a stored location in memory 330. In FIG. 7A, the first index 440A is provided as '1', referencing a second storage location in the memory 330 due to the indices 440 beginning with '0'. This is only an example configuration and is not intended to limit the embodiments of the present disclosure.

The first signal processing operation 410A may analyze the first point 340A referenced by the first index 440A to determine if the first point 340A satisfies the first criteria 415A. For example, the first signal processing operation 410A may analyze the metadata of the first point 340A to determine if one or more of the metadata is satisfactory (e.g., satisfies the first criteria 415A) to be used to generate a point cloud 350.

If the first processing operation 410A determines that the first point 340A referenced by the first index 440A does not satisfy the first criteria 415A, the first processing operation 410A may determine a second point 340B with which to modify the first point 340A. For example, the first signal processing operation may determine that if the first point 340A were modified by the second point 340B (e.g., by using the metadata of the second point 340B), the modified point would satisfy the first criteria 415A.

Responsive to this determination, the first signal processing operation 410A may output a first index 440A_1 referencing the first point 340A and a second index 440B_1 referencing the second point 340B. Stated another way, the first signal processing operation 410A outputs a pair of indices 440 including a first index 440A_1 and a second index 440B_1. The first index 440A_1 that is output by the first signal processing operation 410A, which may be referred to as the original index 440A_1, may point to and/or reference the first point 340A and the second index 440B_1 that is output by the first signal processing operation 410A, which may be referred to as the modified index 440B_1, may point to and/or reference the second point 340B which the first signal processing operation 410A has identified for use in modifying the first point 340A (e.g., to improve and/or repair the first point 340A) to generate the point cloud 350 based on the first criteria 415A. In FIG. 7A, the second index 440B_1 is provided as '4', referencing a fifth storage location in the memory 330.

As illustrated in FIG. 7A, the signal processing system 303 may incorporate a second signal processing operation 410B. The first index 440A_1 and the second index 440B_1 that are output from the first signal processing operation 410A may be input to the second signal processing operation 410B.

The second signal processing operation 410B may analyze the first point 340A referenced by the first index 440A_1 provided by the first signal processing operation 410A to determine if the first point 340A satisfies the second criteria 415B. For example, the second signal processing operation 410B may analyze the metadata of the first point 340A to determine if one or more of the metadata is satisfactory (e.g., satisfies the second criteria 415B) to be used to generate a point cloud 350.

If the second processing operation 410B determines that the first point 340A referenced by the first index 440A_1 provided by the first signal processing operation 410A does not satisfy the second criteria 415B, the second processing operation 410B may determine a third point 340C with which to modify the first point 340A. For example, the second signal processing operation may determine that if the first point 340A were modified by the third point 340C (e.g., by using the metadata of the third point 340C), the modified point would satisfy the second criteria 415B.

Responsive to this determination, the second signal processing operation 410B may output a first index 440A_2 referencing the first point 340A and a second index 440B_2 referencing the third point 340C. Stated another way, the second signal processing operation 410AB outputs a pair of indices 440 including a first index 440A_2 and a second index 440B_2. The first index 440A_2 that is output by the second signal processing operation 410B, which may be referred to as the original index 440A_2, may point to and/or reference the first point 340A and the second index 440B_2 that is output by the second signal processing operation 410B, which may be referred to as the modified index 440B_2, may point to and/or reference the third point 340C which the second signal processing operation 410B has identified for use in modifying the first point 340A (e.g., to improve and/or repair the first point 340A) to generate the point cloud 350 based on the second criteria 415B. In FIG. 7A, the second index 440B_2 is provided as '9', referencing a tenth storage location in the memory 330. In some embodiments, the first index 440A_2 and the second index 440B_2 may be used to generate the point cloud 350 (e.g., by modifying the first point 340A referenced by the first index 440A_2 by using the third point 340C referenced by the second index 440B_2), however, the embodiments of the present disclosure are not limited thereto. In some embodiments, additional signal processing operations 410 may follow the second signal processing operation 410B.

Though FIG. 7A illustrates the progression of a single point (the first point 340A) through the two signal processing operations 410A, 410B, it will be understood that this is only an example. In some embodiments, the signal processing system 303 may continue to process other ones of the points 340 through one or more of the first and second signal processing operations 410A, 410B. For each of the points 340, the signal processing operations 410A, 410B may generate a reference to the respective point 340 as the first index 440A (e.g., the original index 440A) and determine whether the respective point 340 would be improved by modification using another of the points 340, and generate the second index 440B (e.g., the modified index 440B) responsive to the determination.

The use of the first and second indices 440A, 440B illustrated in FIG. 7A allow for the first and second signal processing operations 410A, 410B to indicate which points 340 may be used to modify other points 340 without writing to the memory 330. In other words, the first signal processing operation 410A may indicate that the second point 340B (indicated by index '9' in FIG. 7A) may be used to modify the first point 340A without writing to memory 330. As also illustrated in FIG. 7A, the second signal processing operation 410B may replace the second index 440B with another index 440 based on the analysis of the second signal processing operation 410B. For example, in FIG. 7A, the second signal processing operation 410B may replace the index '4' for the second index 440B_1 with the index '9' as part of the second index 440B_2 output by the second signal processing operation 410B. This allows an intermediate memory operation that would otherwise have been performed by the first signal processing operation 410A with respect to the index '4' to be avoided.

Though FIG. 7A illustrates an embodiment in which each of the signal processing operations 410 determines that the first point 340A does not meet the criteria 415 of the signal processing operation 410, the embodiments of the present disclosure are not limited to such a configuration. FIG. 7B is a block diagram illustrating the use of two signal processing operations 410 in which the first signal processing operation 410A determines that a first point 340A is not to be modified to meet the first criteria 415A, according to some embodiments of the present disclosure. As several elements of FIG. 7B are similar to those of FIG. 7A, a duplicate description thereof will be omitted.

Referring to FIG. 7B, the illustrated scenario is similar to that of FIG. 7A, with the exception that in FIG. 7B the first signal processing operation 410A determines that the first point 340A satisfies the first criteria 415A to be used to generate the point cloud 350. For example, if the first criteria 415A of the first signal processing operation 410A were a comparison of SNR values, the first signal processing operation 410A may determine that the SNR of the first point 340A is sufficient for use in the point cloud 350.

Responsive to determining that the first point 340A referenced by the first index 440A satisfies the first criteria 415A, the first signal processing operation 410A may output a first index 440A_1 referencing the first point 340A and the second index 440B_1 referencing the first point 340A. Stated another way, the first signal processing operation 410A outputs a pair of indices 440 including the first index 440A_1 and the second index 440B_1, both pointing to the same first point 340A. The first index 440A_1 that is output by the first signal processing operation 410A, which may be referred to as the original index 440A_1, may point to and/or reference the first point 340A and the second index 440B_1 that is output by the first signal processing operation 410A, which may be referred to as the modified index 440B_1, may also point to and/or reference the first point 340A which the first signal processing operation 410A has identified as satisfying the first criteria 415A. In FIG. 7B, both the first and second indices 440A_1, 440B_1 are provided as '1', referencing the second storage location in the memory 330.

As illustrated in FIG. 7B, the use of the first and second indices 440A, 440B allows for a simply way to indicate that a given point 340 is not to be modified. When processing the first and second indices 440A, 440B, the signal processing system 303 may determine that the first and second indices 440A, 440B match and that, therefore, the first point 340 referenced by the first index 440A is not to be modified for use in the point cloud 350.

Figure 8:
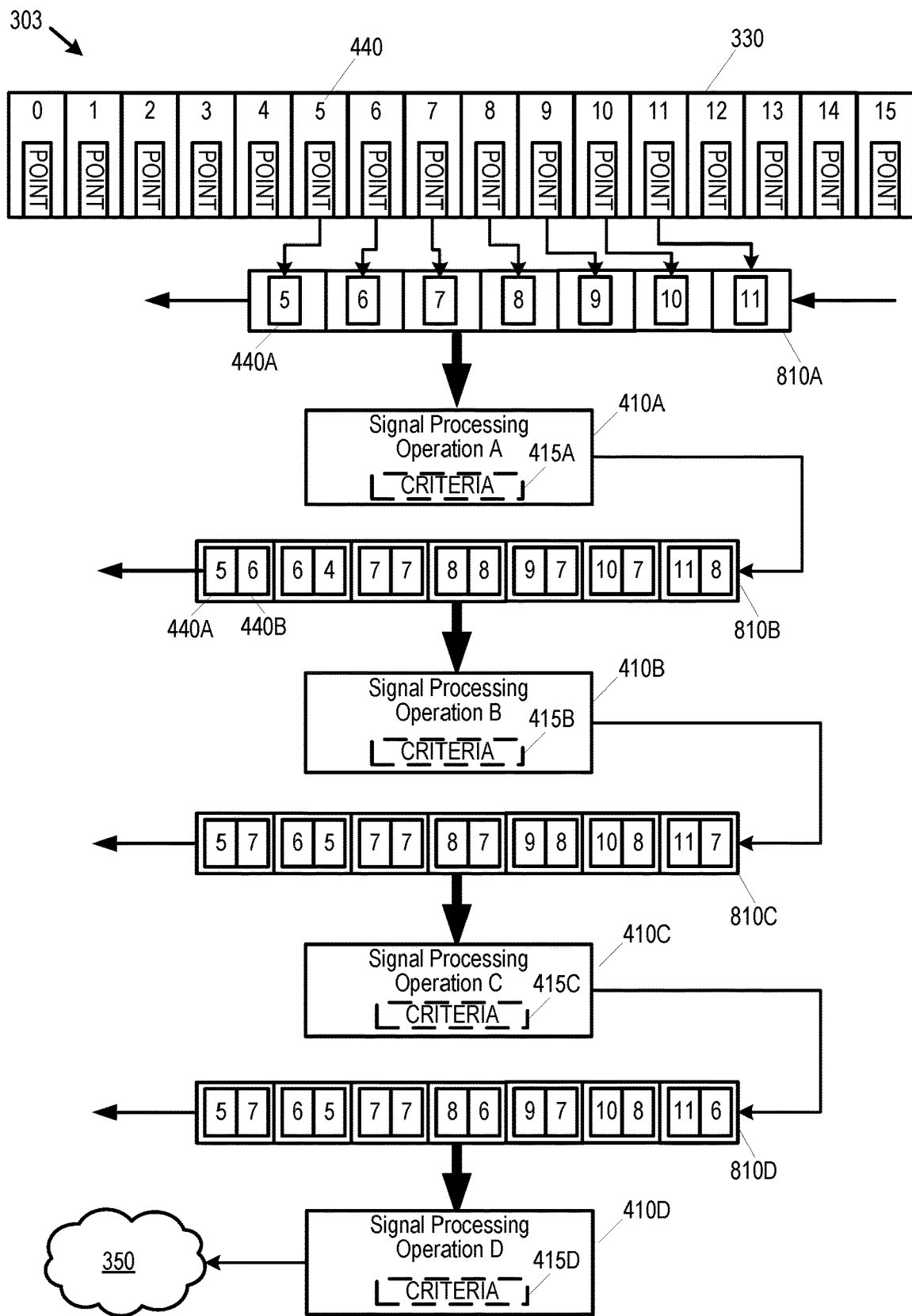
FIG. 8 is a block diagram illustrating an example of operating a signal processing system of a LIDAR system according to some embodiments of the present disclosure.

FIG. 8 is a block diagram illustrating an example of operating a signal processing system 303, according to some embodiments of the present disclosure. A description of elements of FIG. 8 that have been previously provided will be omitted for brevity.

Referring to FIG. 8, the signal processing system 303 may include a plurality of signal processing operations 410 configured to execute sequentially on a plurality of points 340. For example, the output of one of the signal processing operations 410 may be provided as input to a subsequent one of the signal processing operations 410. In FIG. 8, four signal processing operations 410A, 410B, 410C, 410D are illustrated, but the embodiments of the present disclosure are not limited to such a configuration, and more or fewer signal processing operations 410 may be incorporated in the signal processing system 303.

Each of the signal processing operations 410A, 410B, 410C, 410D may analyze respective ones of the points 340 utilizing criteria 415. For example, the first signal processing operation 410A may analyze the points 340 utilizing a first criteria 415A, the second signal processing operation 410B may analyze the points 340 utilizing a second criteria 415B, the third signal processing operation 410C may analyze the points 340 utilizing a third criteria 415C, and the fourth signal processing operation 410D may analyze the points 340 utilizing a fourth criteria 415D. In some embodiments, each of the first through fourth criteria 415A, 415B, 415C, 415D may be different from one another, but the embodiments of the present disclosure are not limited thereto.

The signal processing operations 410A, 410B, 410C, 410D may process the points using the first index 440A (e.g., the original index 440A) and the second index 440B (e.g., the modified index 440B) as previously described herein. For example, a given signal processing operation 410 may output the second index 440B as a reference to a point 340 in memory 330 which may be used to modify the point 340 in memory 330 referenced by the first index 440A so as to meet the criteria 415 for the signal processing operation 410. As these operations have already been described, a duplicate description thereof will be omitted.

In some embodiments, the points 340 to be analyzed by the signal processing operations 410 may be provided using a rotating buffer 810. In some embodiments, the buffer 810 may be a first-in, first-out (FIFO) buffer, but the embodiments of the present disclosure are not limited thereto. A given signal processing operation 410 may extract indices 440 referencing points 340 to be analyzed from the buffer 810, and may output results of the signal processing operation 410 (e.g., the first index 440A and the second index 440B) to another buffer 810.

For example, referring to FIG. 8, the first signal processing operation 410A may receive a series of first indices 440A from a first buffer 810A. Though illustrated as a series of single indices 440A, this is only an example. In some embodiments, the input to the first signal processing operation 410A may be a series of pairs of a first index 440A and a second index 440B, both referencing the same point 340 (e.g., to indicate that the points 340 have not yet been modified).

The first signal processing operation 410A may sequentially operate on the indices 440A from the first buffer 810. For example, as described herein, the first signal processing operation 410A may analyze the point 340 referenced by the first index 440A to determine if the point 340 satisfies the first criteria 415A, and generate a second index 440B responsive to the analysis, as described herein. The first signal processing operation 410A may output a pair of indices, namely the first index 440A and the second index 440B, to a second buffer 810B. For example, the second index 440B output by the first signal processing operation 410A may reference a point 340 in memory 330 which may be used to modify the point 340 referenced by the first index 440A (e.g., when the point 340 referenced by the first index 440A does not satisfy the first criteria 415A), or the second index 440B may reference the same point 340 in memory 330 as the first index 440A (e.g., when the point 340 referenced by the first index 440A satisfies the first criteria 415A).

The pairs of indices 440A, 440B output by the first signal processing operation 410A to the second buffer 810B may be sequentially processed by the second signal processing operation 410B. The second signal processing operation 410B may process the point 340 referenced by the first index 440A of the pair to determine if the point 340 satisfies the second criteria 415B. The second signal processing operation 410B may output pairs of indices 440A, 440B to a third buffer 810C.

The pairs of indices 440A, 440B output by the second signal processing operation 410B to the third buffer 810C may be sequentially processed by the third signal processing operation 410C. The third signal processing operation 410C may process the point 340 referenced by the first index 440A of the pair to determine if the point 340 satisfies the third criteria 415C. The third signal processing operation 410C may output pairs of indices 440A, 440B to a fourth buffer 810D.

The pairs of indices 440A, 440B output by the third signal processing operation 410C to the fourth buffer 810D may be sequentially processed by the fourth signal processing operation 410D. The fourth signal processing operation 410D may process the point 340 referenced by the first index 440A of the pair to determine if the point 340 satisfies the fourth criteria 415D.

The pairs of indices 440A, 440B may then be used to generate the point cloud 350. For example, the point 340 referenced by the second index 440B may be used to modify the point 340 referenced by the first index 440A to generate a new point 340 for the point cloud 350, in a manner similar to that discussed herein with respect to FIG. 6.

The use of the rotating buffers 810, as well as the first and second indices 440A, 440B, allow for the sequential processing of points 340 while reducing an amount of memory writes and/or copies utilized for the processing. As the number of points 340 may be consistently coming into the signal processing system 303 as the LIDAR system 300 scans the FOV, the use of the rotating buffers 810 allows for the processing to be continuous with a relatively small overhead with respect to storage and/or processing resources.

FIG. 9 is a flow diagram of a method 900 for operating a LIDAR system 300, in accordance with some embodiments of the present disclosure. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of the method 900 may be performed by a computing device (e.g., LIDAR control systems 110 and/or signal processing system 303 described herein). In some embodiments, the LIDAR system comprises a frequency-modulated continuous-wave (FMCW) LIDAR system.

Referring simultaneously to the previous figures as well, the method 900 begins at block 910, in which a first index is generated to a first memory location of a first stored value associated with a first data point, from the plurality of data points, and a second index to a second memory location of second stored value associated with a second data point, from the plurality of data points. The data points may be similar to points 340 described herein. The first and second indices may be similar to the first index 440A and the second index 440B, respectively, described herein.

At block 920, using the first and second indices as input, a first processing operation is performed to determine whether to modify the first data point, using the second data point, to produce a new data point. The first processing operation may be similar to the processing operations 410 described herein.

At block 930, provided the first processing operation determines that a first comparison between the first stored value and the second stored value satisfies a first set of criteria, the first and second indices are communicated as input to a second processing operation to determine whether to modify the first data point, using a third data point, to produce the new data point. The first index identifies the first stored value and the second index is adjusted by the second processing operation to identify a third stored value, related to the third data point, stored at a third memory location. The first set of criteria may be similar to the criteria 415 described herein. The second processing operation may be similar to the processing operations 410 described herein.

In some embodiments, the first set of criteria comprises at least one of: a signal-to-noise (SNR) ratio, an intensity threshold, a chirp point position threshold, data representing a spatial location of the target, first metadata describing the spatial location of the target, or second metadata describing acquisition of the spatial location of the target.

At block 940, provided the second processing operation determines that a second comparison between the first stored value and the third stored value satisfies a second set of criteria that is different from the first set of criteria, the first stored value is retrieved, using the first index, to produce a first portion of the new data point for storage within a point cloud, and the third stored value is retrieved, using the second index, to produce a second portion of the new data point for storage within the point cloud.

In some embodiments, the first, second, and third memory locations comprise different memory addresses within a static random access memory (SRAM) (e.g., memory 330 described herein). In some embodiments, the first processing operation and the second processing operation are performed without modifying data stored at the first and second memory locations of the first data point and the second data point.

In some embodiments, the method 900 may further include, provided the first processing operation determines that the first comparison between the first stored value and the second stored value does not satisfy the first set of criteria, selecting a fourth data point, from the plurality of data points, that is associated with a fourth stored value and, provided the first processing operation determines that a third comparison between the first stored value and the fourth stored value satisfies the first set of criteria, adjusting the second index to identify the fourth stored value and communicate the first and second indices to the second processing operation.

In some embodiments, the method 900 may further include, communicating the first and second indices as input to a third processing operation to determine whether to modify the first data point, using a fourth data point, to produce the new data point, wherein the first index identifies the first stored value and the second index is adjusted by the third processing operation to identify a fourth stored value, related to the fourth data point, stored at a fourth memory location. The method 900 may further include, provided the third processing operation determines that a third comparison between the first stored value and the fourth stored value satisfies a third set of criteria, different from the first set of criteria and the third set of criteria, retrieving, using the first index, the first stored value to produce the first portion of the new data point for storage within the point cloud, and retrieving, using the second index, the fourth stored value to produce the second portion of the new data point for storage within the point cloud.

In some embodiments, the method 900 may further include calculating a range and a velocity of the target based on the point cloud, wherein the point cloud comprises the plurality of data points and the new data point.

Figure 10:
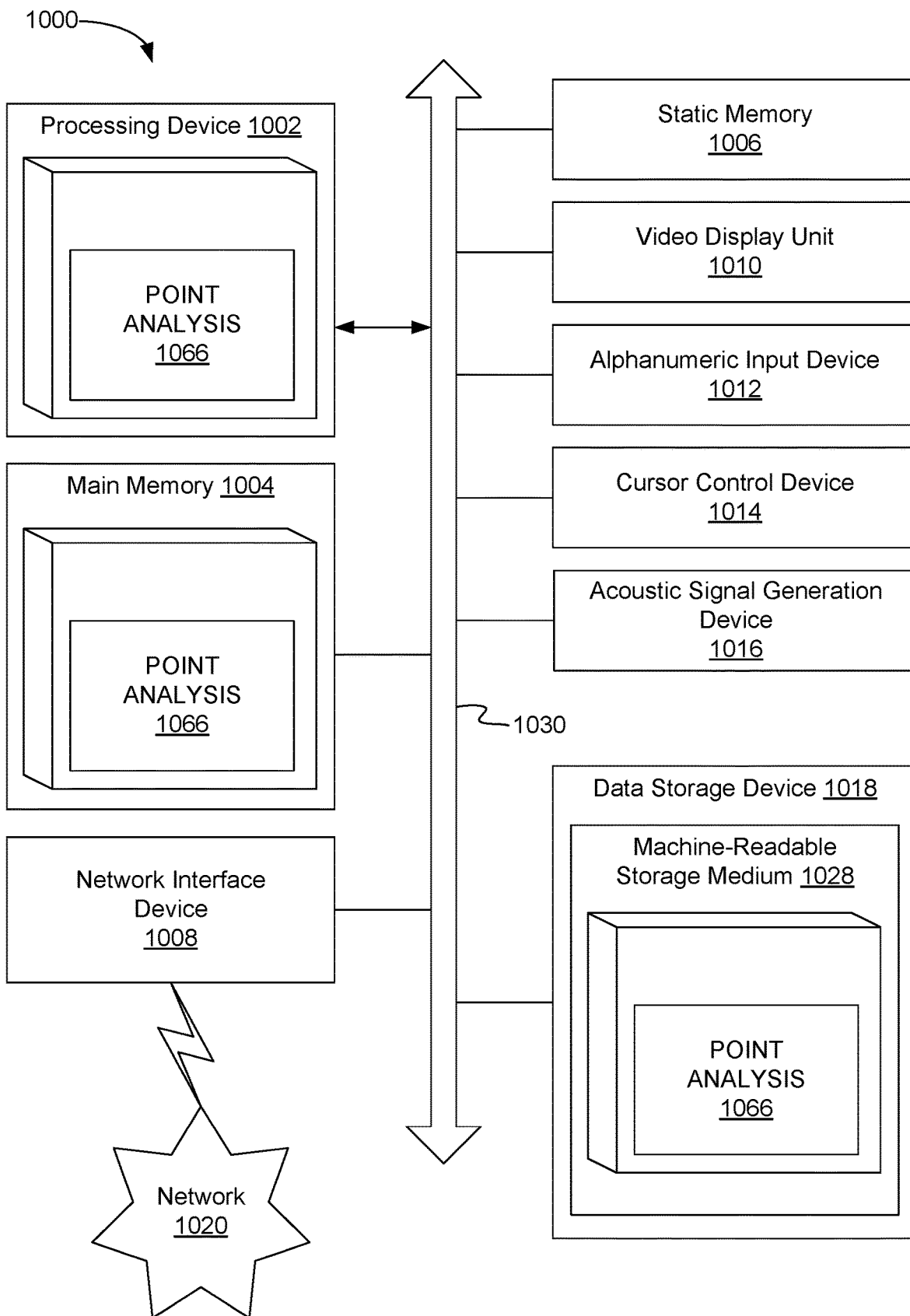
FIG. 10 is a block diagram of an example computing device that may perform one or more of the operations described herein, in accordance with one or more aspects of the disclosure.

FIG. 10 is a block diagram of an example computing device 1000 that may perform one or more of the operations described herein, in accordance with one or more aspects of the disclosure. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also include one or more special-purpose processing devices such as an application specific integrated circuit (ASIC), a field programmable gate array (FPGA), a digital signal processor (DSP), network processor, or the like. The processing device 1002 may execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions that may include instructions for processing points for a point cloud described herein, e.g., point analysis 1066 for carrying out the operations described herein, in accordance with one or more aspects of the present disclosure. The instructions for point analysis 1066 may also reside, completely or at least partially, within main memory 1004 and/or within processing device 1002 during execution thereof by computing device 1000, main memory 1004 and processing device 1002 also constituting computer-readable media. The instructions for point analysis 1066 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation. As used herein, the term "and/or" includes any and all combinations of one or more of the associated listed items.

What is claimed is:

1. A light detection and ranging (LIDAR) system, comprising:

an optical receiver to generate a plurality of data points associated with one or more return beams from a target of the LIDAR system;

a processor; and a memory to store the plurality of data points and store instructions that, when executed by the processor, cause the LIDAR system to:

generate a first index to a first memory location of a first stored value associated with a first data point, from the plurality of data points, and a second index to a second memory location of second stored value associated with a second data point, from the plurality of data points;

using the first and second indices as input, perform a first processing operation to determine whether to modify the first data point, using the second data point, to produce a new data point; and provided the first processing operation determines that a first comparison between the first stored value and the second stored value satisfies a first set of criteria:

communicate the first and second indices as input to a second processing operation to determine whether to modify the first data point, using a third data point, to produce the new data point, wherein the first index identifies the first stored value and the second index is adjusted by the second processing operation to identify a third stored value, related to the third data point, stored at a third memory location; and provided the second processing operation determines that a second comparison between the first stored value and the third stored value satisfies a second set of criteria that is different from the first set of criteria:

retrieve, using the first index, the first stored value to produce a first portion of the new data point for storage within a point cloud; and retrieve, using the second index, the third stored value to produce a second portion of the new data point for storage within the point cloud.

2. The LIDAR system of claim 1, wherein the processor is further to:

provided the first processing operation determines that the first comparison between the first stored value and the second stored value does not satisfy the first set of criteria:

select a fourth data point, from the plurality of data points, that is associated with a fourth stored value; and provided the first processing operation determines that a third comparison between the first stored value and the fourth stored value satisfies the first set of criteria, adjust the second index to identify the fourth stored value and communicate the first and second indices to the second processing operation.

3. The LIDAR system of claim 1, wherein the processor is further to:

communicate the first and second indices as input to a third processing operation to determine whether to modify the first data point, using a fourth data point, to produce the new data point, wherein the first index identifies the first stored value and the second index is adjusted by the third processing operation to identify a fourth stored value, related to the fourth data point, stored at a fourth memory location; and provided the third processing operation determines that a third comparison between the first stored value and the fourth stored value satisfies a third set of criteria, different from the first set of criteria and the third set of criteria:
  retrieve, using the first index, the first stored value to produce the first portion of the new data point for storage within the point cloud; and
  retrieve, using the second index, the fourth stored value to produce the second portion of the new data point for storage within the point cloud.

4. The LIDAR system of claim 1, wherein the first set of criteria comprises at least one of: a signal-to-noise (SNR) ratio, an intensity threshold, a chirp point position threshold, data representing a spatial location of the target, first metadata describing the spatial location of the target, or second metadata describing acquisition of the spatial location of the target.

5. The LIDAR system of claim 1, wherein the first, second, and third memory locations comprise different memory addresses within a static random access memory (SRAM).

6. The LIDAR system of claim 1, wherein the first processing operation and the second processing operation are performed without modifying data stored at the first and second memory locations of the first data point and the second data point.

7. The LIDAR system of claim 1, wherein the processor is further to:
  calculate a range and a velocity of the target based on the point cloud, wherein the point cloud comprises the plurality of data points and the new data point.

8. The LIDAR system of claim 1, wherein the LIDAR system comprises a frequency-modulated continuous-wave (FMCW) LIDAR system.

9. A method of operating a light detection and ranging (LIDAR) system, comprising:
  generating a first index to a first memory location of a first stored value associated with a first data point, from a plurality of data points associated with a target of the LIDAR system, and a second index to a second memory location of second stored value associated with a second data point, from the plurality of data points;
  using the first and second indices as input, perform a first processing operation to determine whether to modify the first data point, using the second data point, to produce a new data point; and
  provided the first processing operation determines that a first comparison between the first stored value and the second stored value satisfies a first set of criteria:
    communicate the first and second indices as input to a second processing operation to determine whether to modify the first data point, using a third data point, to produce the new data point, wherein the first index identifies the first stored value and the second index is adjusted by the second processing operation to identify a third stored value, related to the third data point, stored at a third memory location; and
    provided the second processing operation determines that a second comparison between the first stored value and the third stored value satisfies a second set of criteria that is different from the first set of criteria:
      retrieve, using the first index, the first stored value to produce a first portion of the new data point for storage within a point cloud; and
      retrieve, using the second index, the third stored value to produce a second portion of the new data point for storage within the point cloud.

10. The method of claim 9, further comprising:
provided the first processing operation determines that the first comparison between the first stored value and the second stored value does not satisfy the first set of criteria:
  selecting a fourth data point, from the plurality of data points, that is associated with a fourth stored value; and
  provided the first processing operation determines that a third comparison between the first stored value and the fourth stored value satisfies the first set of criteria, adjusting the second index to identify the fourth stored value and communicate the first and second indices to the second processing operation.

11. The method of claim 9, further comprising:
communicating the first and second indices as input to a third processing operation to determine whether to modify the first data point, using a fourth data point, to produce the new data point, wherein the first index identifies the first stored value and the second index is adjusted by the third processing operation to identify a fourth stored value, related to the fourth data point, stored at a fourth memory location; and
provided the third processing operation determines that a third comparison between the first stored value and the fourth stored value satisfies a third set of criteria, different from the first set of criteria and the third set of criteria:
  retrieving, using the first index, the first stored value to produce the first portion of the new data point for storage within the point cloud; and
  retrieving, using the second index, the fourth stored value to produce the second portion of the new data point for storage within the point cloud.

12. The method of claim 9, wherein the first set of criteria comprises at least one of: a signal-to-noise (SNR) ratio, an intensity threshold, a chirp point position threshold, data representing a spatial location of the target, first metadata describing the spatial location of the target, or second metadata describing acquisition of the spatial location of the target.

13. The method of claim 9, wherein the first processing operation and the second processing operation are performed without modifying data stored at the first and second memory locations of the first data point and the second data point.

14. The method of claim 9, further comprising:
calculating a range and a velocity of the target based on the point cloud, wherein the point cloud comprises the plurality of data points and the new data point.

15. A non-transitory computer-readable storage medium including instructions that, when executed by a processor, cause the processor to:
  generate a first index to a first memory location of a first stored value associated with a first data point, from a plurality of data points associated with a target of a light detection and ranging (LIDAR) system, and a second index to a second memory location of second stored value associated with a second data point, from the plurality of data points;
  using the first and second indices as input, perform a first processing operation to determine whether to modify the first data point, using the second data point, to produce a new data point; and
  provided the first processing operation determines that a first comparison between the first stored value and the second stored value satisfies a first set of criteria:

communicate the first and second indices as input to a second processing operation to determine whether to modify the first data point, using a third data point, to produce the new data point, wherein the first index identifies the first stored value and the second index is adjusted by the second processing operation to identify a third stored value, related to the third data point, stored at a third memory location; and provided the second processing operation determines that a second comparison between the first stored value and the third stored value satisfies a second set of criteria that is different from the first set of criteria:

retrieve, using the first index, the first stored value to produce a first portion of the new data point for storage within a point cloud; and retrieve, using the second index, the third stored value to produce a second portion of the new data point for storage within the point cloud.

16. The non-transitory computer-readable storage medium of claim 15, wherein the processor is further to:

provided the first processing operation determines that the first comparison between the first stored value and the second stored value does not satisfy the first set of criteria:

select a fourth data point, from the plurality of data points, that is associated with a fourth stored value; and provided the first processing operation determines that a third comparison between the first stored value and the fourth stored value satisfies the first set of criteria, adjust the second index to identify the fourth stored value and communicate the first and second indices to the second processing operation.

17. The non-transitory computer-readable storage medium of claim 15, wherein the processor is further to:

communicate the first and second indices as input to a third processing operation to determine whether to modify the first data point, using a fourth data point, to produce the new data point, wherein the first index identifies the first stored value and the second index is adjusted by the third processing operation to identify a fourth stored value, related to the fourth data point, stored at a fourth memory location; and provided the third processing operation determines that a third comparison between the first stored value and the fourth stored value satisfies a third set of criteria, different from the first set of criteria and the third set of criteria:

retrieve, using the first index, the first stored value to produce the first portion of the new data point for storage within the point cloud; and retrieve, using the second index, the fourth stored value to produce the second portion of the new data point for storage within the point cloud.

18. The non-transitory computer-readable storage medium of claim 15, wherein the first set of criteria comprises at least one of: a signal-to-noise (SNR) ratio, an intensity threshold, a chirp point position threshold, data representing a spatial location of the target, first metadata describing the spatial location of the target, or second metadata describing acquisition of the spatial location of the target.

19. The non-transitory computer-readable storage medium of claim 15, wherein the first, second, and third memory locations comprise different memory addresses within a static random access memory (SRAM).

20. The non-transitory computer-readable storage medium of claim 15, wherein the processor is further to:

calculate a range and a velocity of the target based on the point cloud, wherein the point cloud comprises the plurality of data points and the new data point.

\* \* \* \* \*